US011970261B2

(12) United States Patent
Eche et al.

(10) Patent No.: US 11,970,261 B2
(45) Date of Patent: Apr. 30, 2024

(54) LOCKING FINGER FOR AN ELECTRIC MOTOR SHAFT

(71) Applicant: SAFRAN ELECTRICAL & POWER, Blagnac (FR)

(72) Inventors: Jacques Eche, Blagnac (FR); Yann Tondriaux, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 132 days.

(21) Appl. No.: 17/597,316

(22) PCT Filed: Jul. 2, 2020

(86) PCT No.: PCT/FR2020/051168
§ 371 (c)(1),
(2) Date: Jan. 3, 2022

(87) PCT Pub. No.: WO2021/005288
PCT Pub. Date: Jan. 14, 2021

(65) Prior Publication Data
US 2022/0315203 A1 Oct. 6, 2022

(30) Foreign Application Priority Data
Jul. 9, 2019 (FR) ...................................... 1907650

(51) Int. Cl.
*B64C 11/02* (2006.01)
*B64C 27/12* (2006.01)

(52) U.S. Cl.
CPC .............. *B64C 11/02* (2013.01); *B64C 27/12* (2013.01)

(58) Field of Classification Search
CPC .... F03D 7/0244; F03D 7/0248; F03D 7/0268; F05B 2260/31
See application file for complete search history.

(56) References Cited

U.S. PATENT DOCUMENTS

| 6,622,962 B1 * | 9/2003 | White | B64C 27/26 244/12.3 |
| 7,175,131 B2 * | 2/2007 | Dodu | F42B 10/64 244/99.2 |

(Continued)

FOREIGN PATENT DOCUMENTS

CN 105564634 A 5/2016

OTHER PUBLICATIONS

French Search Report issued in French Application FR1907650 dated Mar. 11, 2020 (2 pages).

(Continued)

*Primary Examiner* — Sabbir Hasan
*Assistant Examiner* — Arthur Paul Golik
(74) *Attorney, Agent, or Firm* — Bookoff McAndrews, PLLC

(57) ABSTRACT

Aircraft comprising a primary propeller driven in rotation by a motor, the motor having a first assembly and a second assembly movable in rotation relative to each other along an axis of rotation, the primary propeller being secured in rotation to one of said first assembly and second assembly, the first assembly and the second assembly being movable in translation relative to each other along a direction of translation defined by the axis of rotation, between a rest position and a service position, characterized in that said aircraft comprises a locking system, comprising a housing and an indexing element, the housing being formed in one among the first assembly and the second assembly, the indexing element being secured to the other among the first assembly and the second assembly, the locking system having an engaged configuration in which the indexing element is at least partially inserted into the housing.

10 Claims, 6 Drawing Sheets

(56) References Cited

U.S. PATENT DOCUMENTS

| | | |
|---|---|---|
| 9,783,288 B1 | 10/2017 | Moore et al. |
| 2003/0034420 A1 | 2/2003 | Konig |
| 2019/0193834 A1 | 6/2019 | Deng et al. |

OTHER PUBLICATIONS

International Search Report issued in International Application PCT/FR2020/051168 dated Sep. 23, 2020 with English Translation (4 pages).

* cited by examiner

[Fig. 1A]
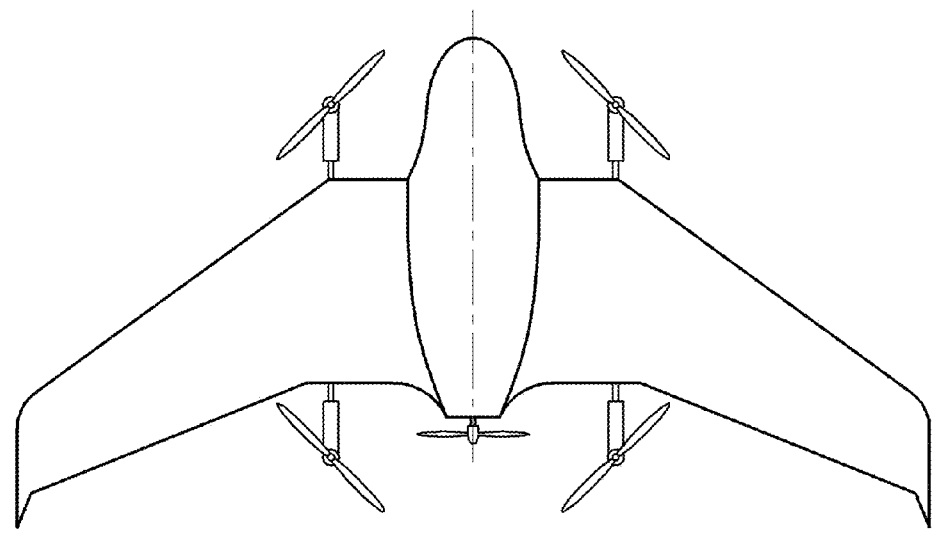
[Fig. 1B]
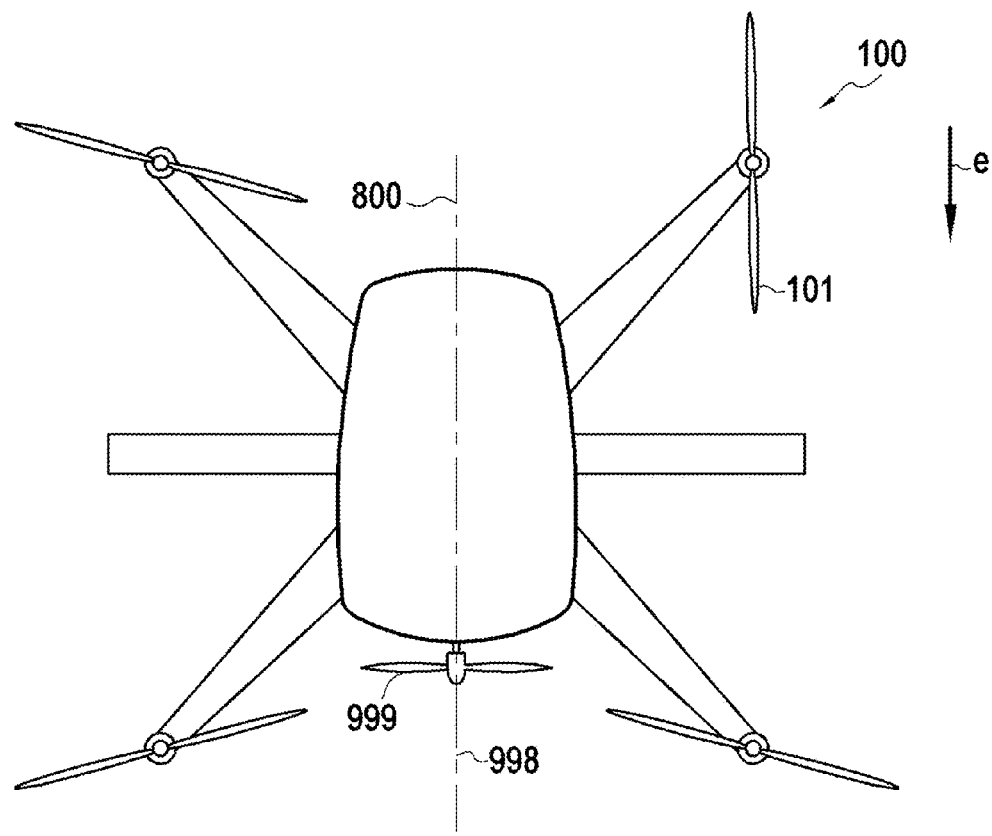

[Fig. 1C]
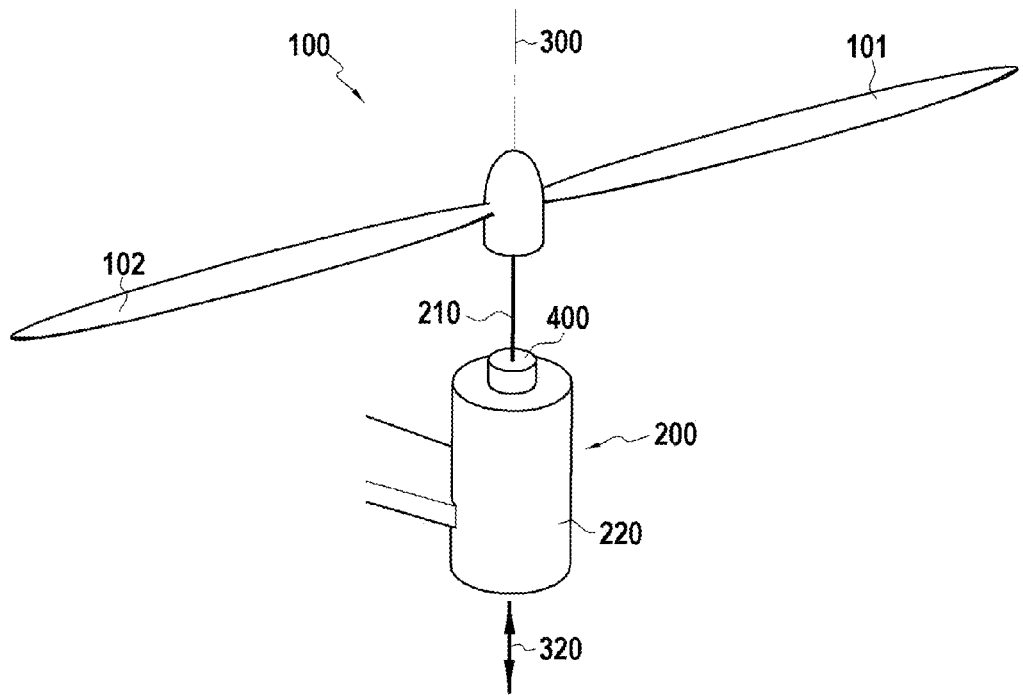
[Fig. 1D]
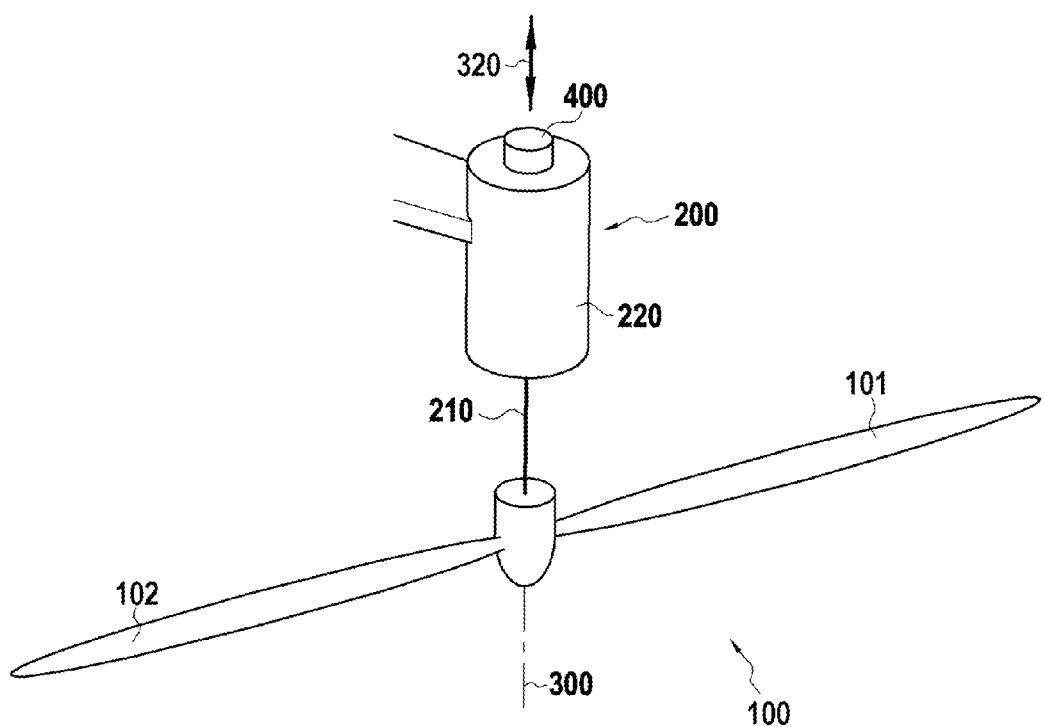

[Fig. 2A]
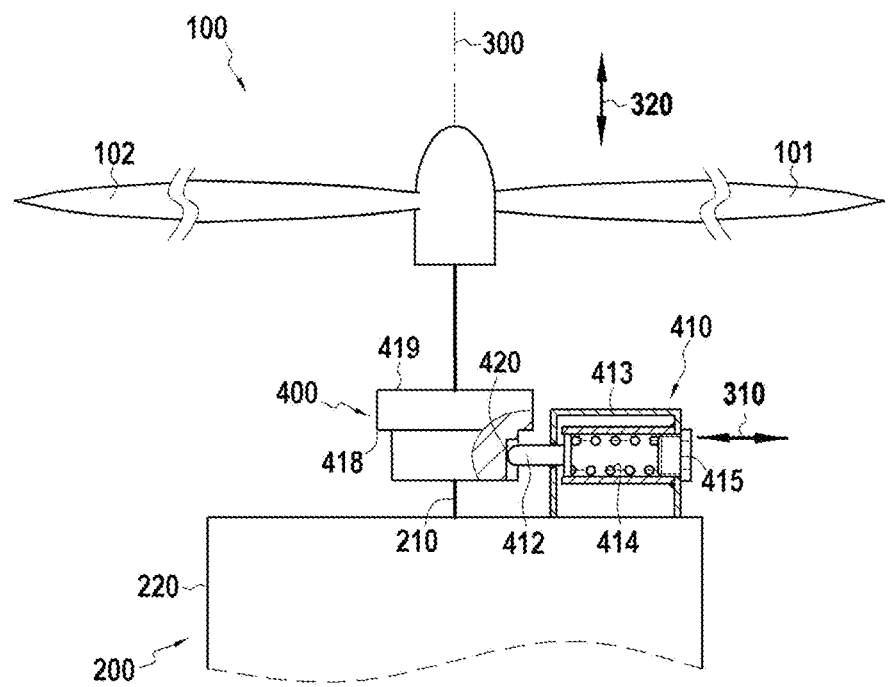
[Fig. 2B]
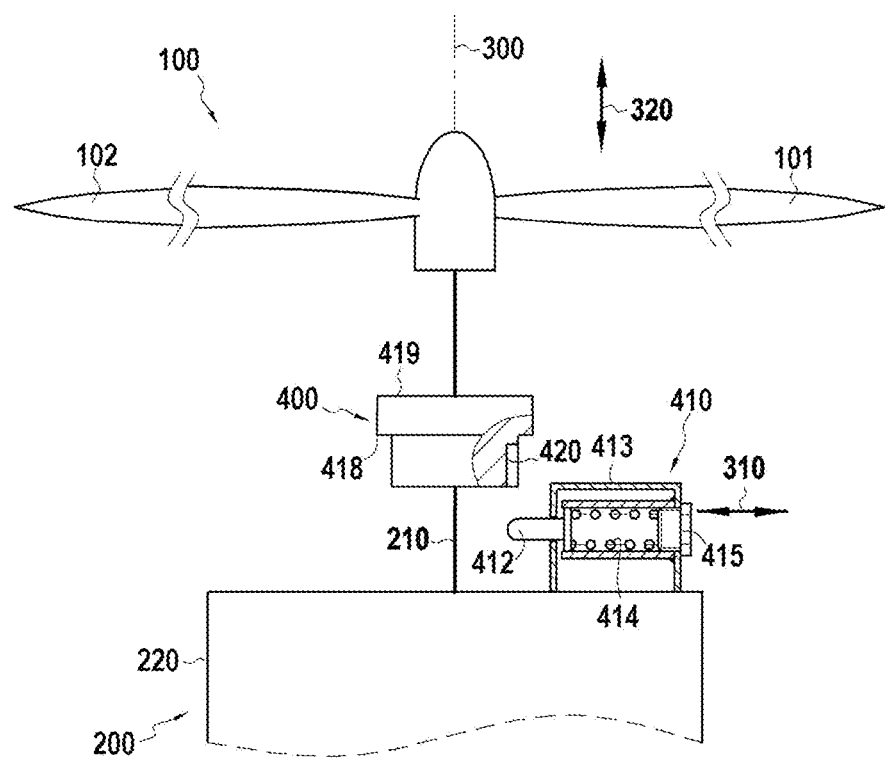

[Fig. 2C]
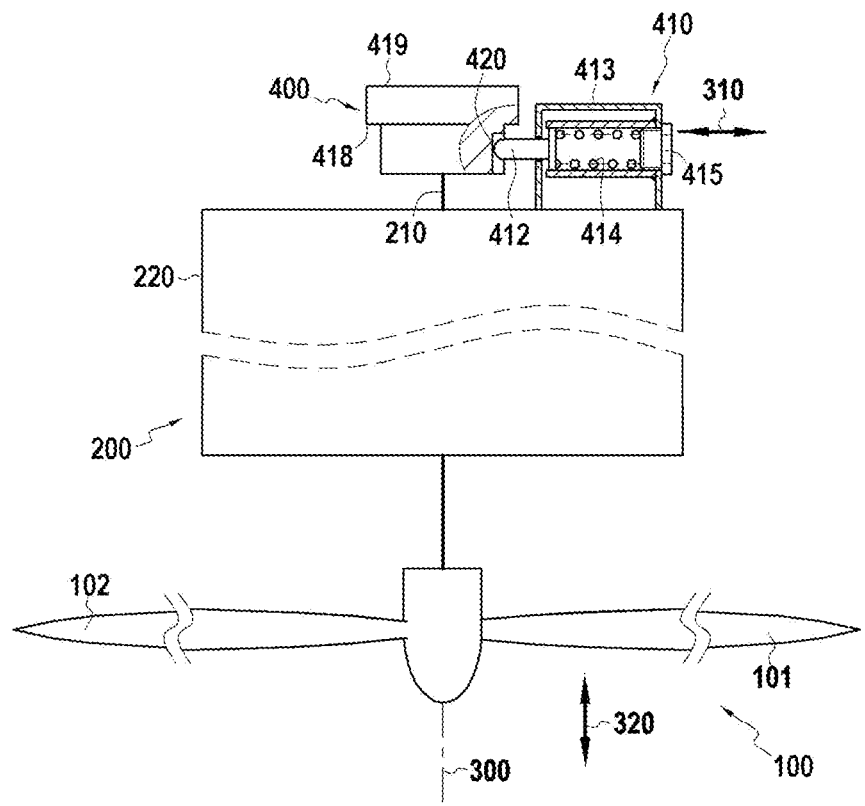
[Fig. 2D]
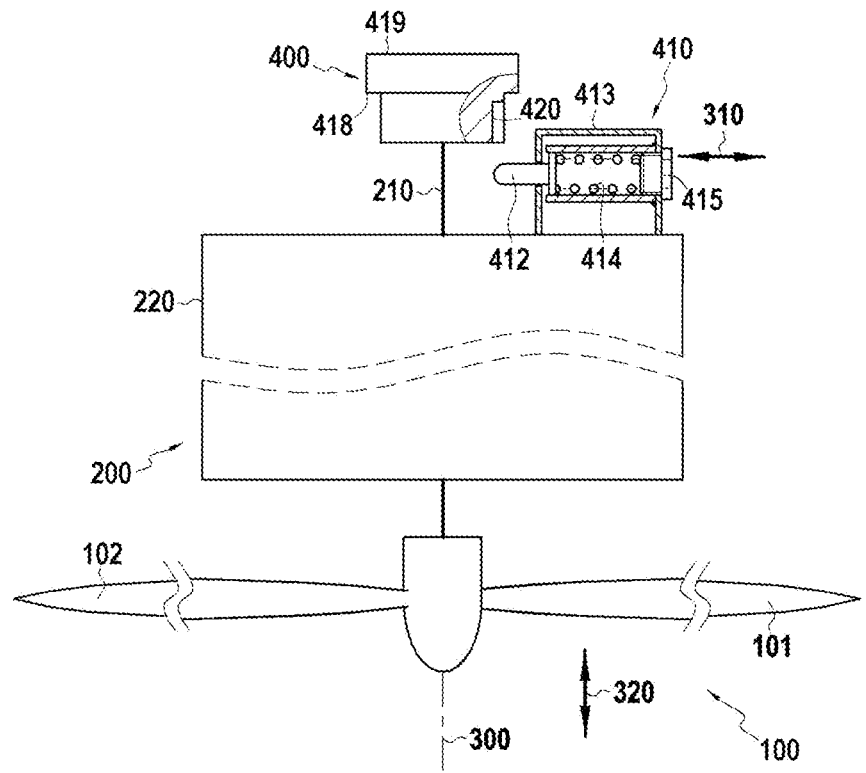

[Fig. 3A]
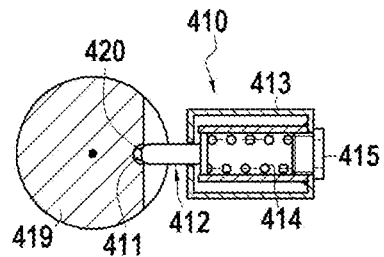
[Fig. 3B]
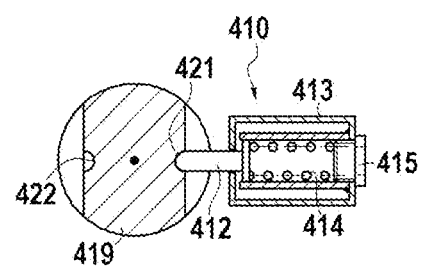
[Fig. 4A]
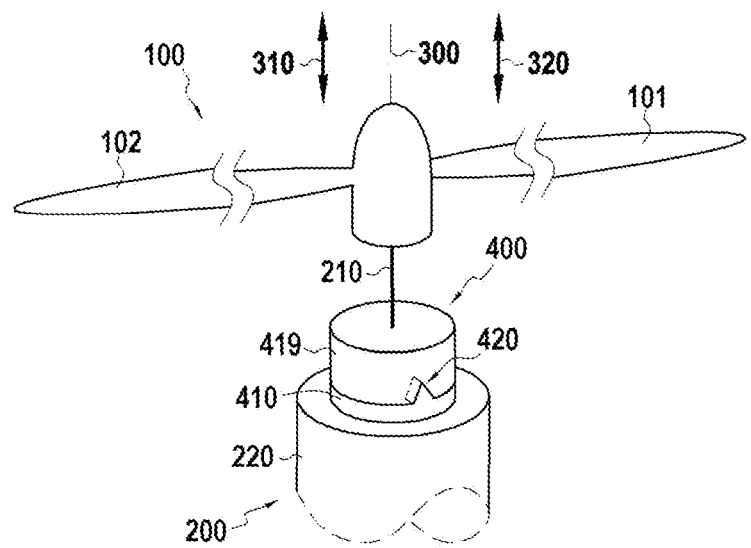
[Fig. 4B]
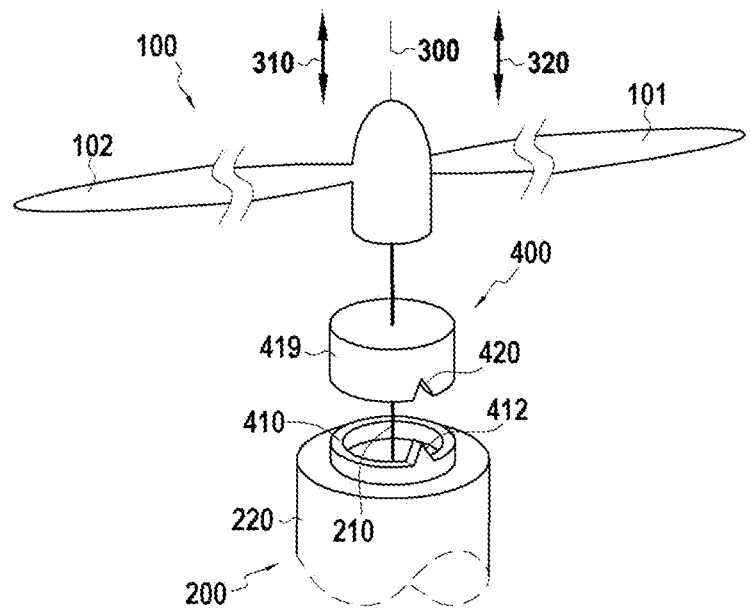

[Fig. 4C]
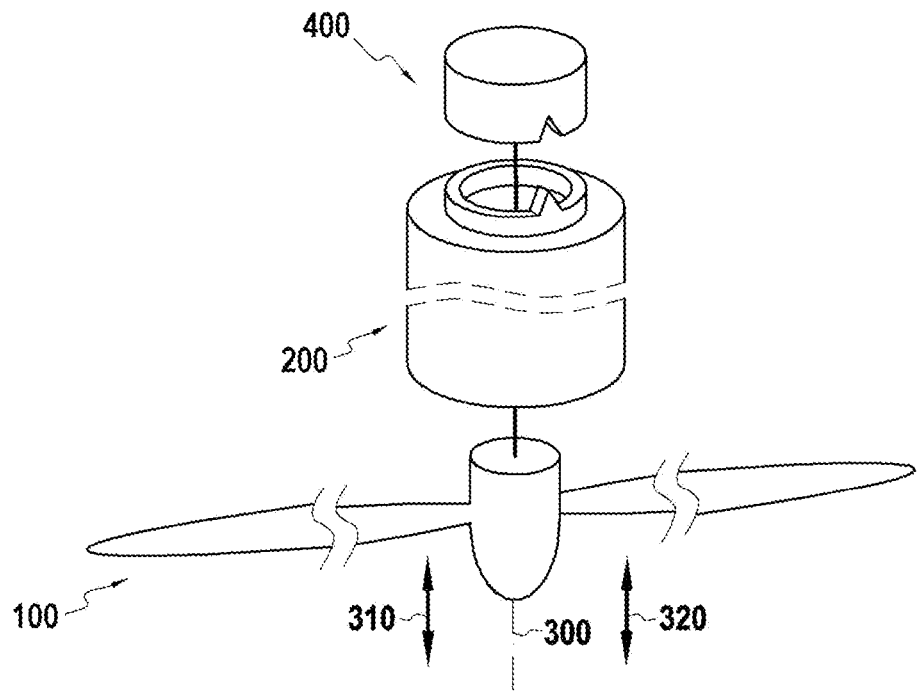
[Fig. 5]
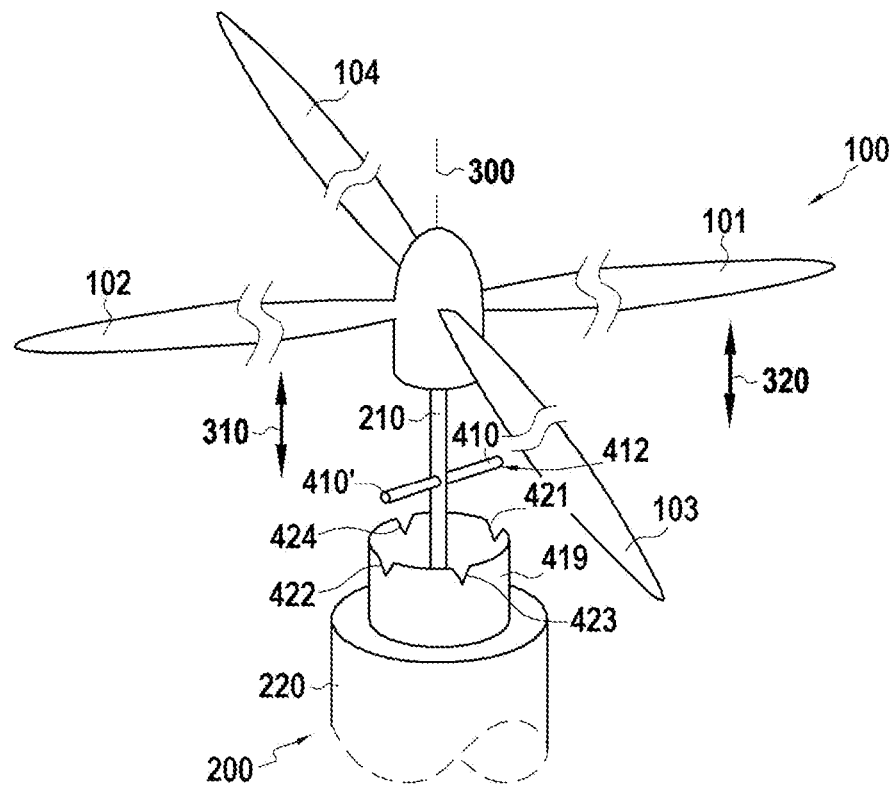

LOCKING FINGER FOR AN ELECTRIC MOTOR SHAFT

CROSS-REFERENCE TO RELATED APPLICATIONS

This patent application is the U.S. National Stage entry under 35 U.S.C. § 371 of International Patent Application No. PCT/FR2020/051168, filed on Jul. 2, 2020, which claims the benefit of priority to French Patent Application No. 1907650, filed on Jul. 9, 2019.

TECHNICAL FIELD

The present disclosure relates to the field of shaft locking systems in the field of aviation, and relates more specifically to the locking of a shaft for an aircraft propeller.

PRIOR ART

Vertical take-off aircrafts are known, comprising one or several propellers for performing a substantially vertical flight phase and a propulsion means for performing a substantially transverse flight phase. Thus, such aircrafts are adapted to take off and/or land vertically (which eliminates the need for long take-off/landing runways) while maintaining a cruising ability similar to a conventional aircraft. Such an aircraft can be seen in FIG. 1A.

When such an aircraft performs a flight phase other than a vertical one, this tends to generate a flow of air along a direction which is substantially perpendicular to an axis of rotation of one of the propellers of the aircraft. For example, during a cruise phase, the flow may be substantially perpendicular to the axis of rotation of one of the propellers used during take-off and/or landing phases.

This flow can cause a rotation of the propeller. When the propeller is not driven by a motor, this is referred to as free rotation of the propeller (or windmilling). As a result, variable forces can be transmitted by the propeller to the aircraft, which may disturb the stability of the aircraft, in particular when these variations are unpredictable and/or non-homogeneous from one motor (or propeller) to another.

Furthermore, this rotation may increase the aerodynamic drag of the aircraft, which is detrimental to the energy efficiency of the aircraft.

To overcome these problems, it is known to lock the propeller by applying a motor torque thereto. The energy consumption caused by the application of this torque affects the energy efficiency of the aircraft in flight.

DISCLOSURE OF THE INVENTION

The present disclosure thus aims to address at least partially these issues, and thus proposes an aircraft comprising a primary propeller driven in rotation by a motor, the motor having a first assembly and a second assembly movable in rotation relative to each other along an axis of rotation, the primary propeller being secured in rotation to one of said first assembly and second assembly, said aircraft comprising a locking system, comprising a housing and an indexing element, the housing being formed in one among the first assembly and the second assembly, the indexing element being secured to the other among the first assembly and the second assembly, the locking system having an engaged configuration in which the indexing element is at least partially inserted into the housing, and a free configuration in which the indexing element is not at least partially inserted into the housing, the locking system being configured such that, in the engaged configuration, the rotational movement of the first assembly relative to the second assembly is limited to a predetermined angular sector, for example less than 5° or for example less than 1°, the locking system being configured so as to switch from the engaged configuration to the free configuration when the motor applies a rotational torque greater than a torque threshold value on the first assembly or on the second assembly, characterized in that the first assembly and the second assembly are movable in translation relative to each other along a direction of translation defined by the axis of rotation, between a rest position and a service position, and in that the locking system can be in the engaged configuration only when the first assembly and the second assembly are in the rest position.

According to one example, the indexing element comprises a rolling element able to be introduced into the housing.

According to one example, the aircraft is configured so that a thrust, generated during a driving of the primary propeller by the motor, opposes a switching of the first assembly and the second assembly from the service position to the rest position.

According to one example, the locking system comprises a return device tending to insert the indexing element into the housing when the first assembly and the second assembly are in the rest position.

According to one example, the return device comprises a support spring for pushing one of the indexing element and of the housing towards the other, and a calibration screw in cooperation with the support spring to modify a stiffness of the return device.

According to one example, the indexing element is inserted into the housing along a direction of insertion which is substantially perpendicular to the axis of rotation, and the return device tends to insert the indexing element into the housing when the first assembly and the second assembly are in the rest position.

According to one example, the indexing element is inserted into the housing along a direction of insertion which is parallel or substantially parallel to the axis of rotation, and the first assembly and the second assembly leave the rest position when the locking system leaves the engaged configuration.

According to one example, the locking system comprises several housings.

According to one example, the locking system comprises a number of housings equal to a number of blades of the primary propeller.

According to one example, the locking system comprises a number of indexing elements less than a number of blades of the primary propeller.

The proposed aircraft can thus overcome the instability and/or energy inefficiency affecting known aircraft, since locking and unlocking of its primary propeller can be carried out passively.

BRIEF DESCRIPTION OF THE DRAWINGS

FIG. 1A is a known aircraft.
FIG. 1B is an aircraft according to the present disclosure.
FIG. 1C represents a motor, a primary propeller and a locking system according to a first configuration.
FIG. 1D represents a motor, a primary propeller and a locking system according to a second configuration.

FIGS. 2A-2B represent a primary propeller, a locking system for the configuration shown in FIG. 1C and a motor whose first assembly and second assembly are respectively in a first position (FIG. 2A) and a second position (FIG. 2B).

FIGS. 2C-2D represent a primary propeller, a locking system for the configuration shown in FIG. 1D and a motor whose first assembly and second assembly are respectively in a first position (FIG. 2C) and a second position (FIG. 2D).

FIGS. 3A-3B represent respectively the locking system shown in FIGS. 2A-2D (FIG. 3A) and a variant thereof with an alternative component (FIG. 3B).

FIGS. 4A-4B represent a primary propeller, a locking system for the configuration shown in FIG. 1C and a motor, whose first assembly and second assembly are respectively in the first position (FIG. 4A) and the second position (FIG. 4B).

FIG. 4C represents a primary propeller, a locking system for the configuration shown in FIG. 1D and a motor, whose first assembly and second assembly are in the second position.

FIG. 5 represents a primary propeller, a locking system and a motor, whose first assembly and second assembly are in the second position.

DESCRIPTION OF THE EMBODIMENTS

FIG. 1B shows an aircraft according to the present disclosure, during a displacement substantially perpendicular to an axis of rotation of a primary propeller 100 of the aircraft. This displacement may tend to generate a flow of air along a direction "e" which is substantially perpendicular to the axis of rotation of the primary propeller 100 of the aircraft. The aircraft can comprise one or several primary propellers 100. For example, the aircraft represented in FIG. 1B comprises four primary propellers.

By way of example, the aircraft can comprise a transverse thrust means for moving the aircraft substantially perpendicular to the axis of rotation of the primary propeller 100. The transverse thrust means can comprise, for example, a secondary propeller 999 whose axis of rotation 998 is substantially perpendicular to that of the primary propeller 100, as seen in FIG. 1B.

An aircraft according to the present disclosure can be configured to soar in a direction substantially perpendicular to the axis of rotation of the primary propeller 100 when the primary propeller 100 is not driven by a motor 200 shown in particular in FIGS. 1C and 1D. In this case, the aircraft may not comprise the transverse thrust means.

According to one example, the motor 200 can be an electric motor.

As seen in FIG. 1C, the motor 200 has a first assembly 210 and a second assembly 220 which are movable in rotation relative to each other along an axis of rotation 300. The primary propeller 100 may be secured in rotation to one of said first assembly 210 and second assembly 220.

For example, the second assembly 220 comprises a stator of the motor 200, and the first assembly 210 comprises a rotor of the motor 200. The stator comprises, for example, a casing of the motor 200 and the rotor comprises, for example, a rotary shaft of the primary propeller 100. The axis of rotation 300 may be coincident or substantially coincident with the shaft of the primary propeller 100.

In general, the first assembly 210 and the second assembly 220 are movable in translation relative to each other along a direction of translation 320 between a rest position and a service position. This translation can be caused, for example, by generating a thrust by the primary propeller 100, or by stopping this thrust generation. The direction of translation 320 can for example coincide with the axis of rotation 300. By way of example, the rest position is the position of the rotor (or of the shaft of the primary propeller 100) relative to the stator (or relative to the casing) adopted in the absence of thrust by the primary propeller 100, and the service position is the position of the rotor (or of the shaft of the primary propeller 100) relative to the stator (or relative to the casing) adopted during the generation of the thrust by the primary propeller 100.

The translational movement of the first 210 and second 220 assemblies defines a translational stroke of the first 210 and second 220 assemblies which may be on the order of 2 mm or more, or be comprised between 2 and 8 mm. According to one example, the stroke corresponds to the axial clearance of the motor 200. In general, the translational stroke can be predefined as needed.

In general, when the motor 200 drives the primary propeller 100, the primary propeller 100 generates a thrust tending to bring the primary propeller 100 closer to the motor 200 (or to the aircraft) or to move the primary propeller 100 apart from the motor 200 (or from the aircraft). When the thrust tends to move the primary propeller 100 apart from the motor 200 (or from the aircraft), this is referred to as "traction" configuration; when the thrust tends to bring them closer to each other, this is referred to as "propulsion".

The aircraft comprises a locking system 400, which may be disposed between the motor 200 and the primary propeller 100 when the motor 200 and the primary propeller 100 cooperate in the traction configuration. As seen in FIG. 1D, the motor 200 may be disposed between the locking system 400 and the primary propeller 100 when the motor 200 and the primary propeller 100 cooperate in the propulsion configuration.

In general, the locking system 400 has an engaged configuration and a free configuration. In the engaged configuration, the rotational movement of the first assembly 210 relative to the second assembly 220 can be limited to an angular sector of less than 5°. More particularly, the rotational movement of the first assembly 210 relative to the second assembly 220 can be limited, after adjustment and calibration, to an angular sector of less than 1°. Thus, it is possible to define the forces applied to the aircraft by the primary propeller 100 at a set of predefined values or ranges of values, and/or to reduce the variability of these forces to the minimum. When the first assembly 210 and the second assembly 220 are in the rest position, the locking system 400 can switch to the engaged configuration. When the first assembly 210 and the second assembly 220 are in the service position, the locking system 400 cannot switch into the engaged configuration.

In general, the aircraft can be configured so that a thrust generated during a driving of the primary propeller 100 by the motor 200 opposes a switching of the first assembly 210 and of the second assembly 220 from the service position to the rest position. Thus, this thrust can oppose the switching of the locking system 400 into the engaged configuration.

The locking system 400 can switch from the engaged configuration to the free configuration when the motor 200 applies a rotational torque greater than a torque threshold value on the first assembly 210 or on the second assembly 220. This rotational torque can be a starting torque, for example.

As seen in FIG. 2A the locking system 400 comprises, in general, a housing 420 and an indexing element 410. A shape of the housing 420 may correspond substantially to a shape of the indexing element 410.

For example, in FIG. 3A, the housing 420 has a concave bottom surface, which is here semi-circular (for example, a substantially spherical/hemi-spherical surface or a substantially cylindrical/hemi-cylindrical surface) with a radius greater than that of a corresponding convex surface of the indexing element 410. When the concave surface of the housing 420 is substantially hemi-cylindrical or cylindrical, the corresponding convex surface of the indexing element 410 can be substantially spherical/hemi-spherical or substantially cylindrical/hemi-cylindrical. When the concave surface of the housing 420 is spherical or hemi-spherical, the corresponding convex surface of the indexing element 410 can be spherical or hemi-spherical.

The bottom surface of the housing 420 can be connected to the circumferential surface of the cylindrical part 419 by a frustoconical surface or flat surfaces, or can join the circumferential surface of the cylindrical part 419 directly.

For example, in FIG. 4B, the indexing element 410 is a lug, and the housing 420 is a notch having a shape complementary to that of the lug and in which all or part of the lug engages.

For example in FIG. 5, the indexing element 410 is a rod and the housing 421 is a notch in which the rod is housed.

In general, the housing 420 can be formed on or in one among the first assembly 210 and the second assembly 220, and the indexing element 410 can be secured to or formed on the other among the first assembly 210 and the second assembly 220.

For example, in FIG. 5, the housing 421 is formed on or in the second assembly 220, and the indexing element 410 is secured to the first assembly 210. In FIG. 2A, the housing 420 is formed on or in the first assembly 210, and the indexing element 410 is secured to the second assembly 220.

In general, in the engaged configuration, at least part of the indexing element 410 is inserted into the housing 420. Conversely, in the free configuration, the indexing element 410 is not at least partially inserted into the housing 420, as seen in FIG. 2B.

In general, the housing 420 and the indexing element 410 are moved apart from each other along the direction of translation 320 when the first assembly 210 and the second assembly 220 are in the service position. As seen in FIG. 2A, the housing 420 and the indexing element 410 are brought closer to each other along the direction of translation 320 when the first assembly 210 and the second assembly 220 are in the rest position.

In general, as seen in FIGS. 2A-2D, a locking system 400 can be considered as configured for a traction configuration when a separation of the housing 420 from the indexing element 410 is caused by a separation of the primary propeller 100 from the motor 200, and the locking system 400 can be considered as configured for a propulsion configuration when the separation of the housing 420 from the indexing element 410 is caused by an approximation of the primary propeller 100 to the motor 200.

As can be seen in FIGS. 2A-2B, in the traction configuration, the translation of the primary propeller 100 apart from the motor 200 (or from the aircraft) can also move the housing 420 apart from the indexing element 410 by switching the first assembly 210 and the second assembly 220 of the motor 200 to the service position. As can be seen in FIGS. 2C-2D, in the propulsion configuration, the translation of the primary propeller 100 according to an approximation to the motor 200 (or to the aircraft) can move the housing 420 apart from the element of indexing 410 (or vice versa) by switching the first assembly 210 and the second assembly 220 of the motor 200 to the service position.

When the motor 200 and the primary propeller 100 cooperate in the two configurations, the two arrangements of the motor 200 and of the locking system 400 relative to the primary propeller 100 are possible. Generally speaking, the locking system 400, configured for a traction configuration, can be reconfigured for a propulsion configuration (or vice versa) by reversing the orientation of the housing 420 and of the indexing element 410 on the direction of translation 320. Thus, the translation of the primary propeller 100 apart from the motor 200 (or from the aircraft) can move the housing 420 apart from the indexing element 410 in a first direction along the direction of translation 320 during a traction configuration, and the translation of the primary propeller 100 towards the motor 200 (or towards the aircraft) can move the housing 420 apart from the indexing element 410 along a second direction along the direction of translation 320, opposite to the first direction, during a propulsion configuration. This possibility will be detailed later using FIGS. 2A-2D and 4A-5.

As seen in FIG. 3A, the indexing element 410 can comprise a rolling element 411 which is able to be introduced into the housing 420. The rolling element 411 can be disposed on a free end 412 of the indexing element 410. The rolling element 411 can be made as a roller.

As seen in FIG. 2A, the locking system 400 can comprise a return device 413 tending to insert the indexing element 410 into the housing 420 when the first assembly 210 and the second assembly 220 are in the rest position.

The return device can comprise a support spring 414 to urge one of the indexing member 410 and of the housing 420 toward the other. For example, the support spring 414 can be configured to push the indexing element 410 towards the housing 420.

The return device 413 can comprise a calibration screw 415 adapted to cooperate with the support spring 414, to modify a stiffness of the return device 413. By varying the stiffness of the return device 413, it is possible to vary the torque threshold of the locking system 400. A higher stiffness corresponds to a higher torque threshold value, and a lower stiffness corresponds to a lower torque threshold value.

In general, during the switching of the locking system 400 to the engaged configuration, the indexing element 410 is inserted into the housing 420 along a direction of insertion 310.

As seen in FIGS. 4A-4B, the direction of insertion 310 may be substantially parallel to the direction of translation 320, or to the axis of rotation 300. Thus, it may be possible to switch to the configuration engaged using the weight of the first assembly 210 or of the second assembly 220, and/or using the weight of the primary propeller 100 and/or the weight of its shaft (in the case of a substantially vertical axis of rotation 300 for example). Otherwise, when the axis of rotation 300 is substantially horizontal, for example, this configuration allows the locking system 400 to enter the engaged configuration using the aeronautical drag on the primary propeller 100.

Alternatively, as can be seen in FIG. 2A, the direction of insertion 310 can be substantially perpendicular to the direction of translation 320, or to the axis of rotation 300. This configuration can allow reducing the length of the shaft of the primary propeller 100, and/or minimizing the space requirement of the locking system 400 in the direction of translation 320. When the return device 413 is present, it can facilitate the insertion of the indexing element 410 into the housing 420 when the first assembly 210 and the second assembly 220 are in the rest position, and can maintain the engaged configuration as well. A direction of insertion 310 perpendicular to the direction of translation 320 can also facilitate the calibration of the stiffness of the return device 413.

It is also planned to use a return device 413 when the direction of insertion 310 is parallel to the direction of translation 320.

In general, a given housing can define at least one locking position, which is predetermined. Advantageously, in the locking position, at least one blade 101 of the primary propeller 100 extends substantially in the same direction, relative to the aircraft, as the direction "e" of air flow around the aircraft during at least part of a flight phase, as seen in FIG. 1B. This is referred to as "flag" position. For example, during a cruise phase, air flows around the aircraft substantially parallel to a longitudinal axis of the aircraft. In this case, the blade 101, extending radially from the shaft of the primary propeller 100, can be oriented such that its radial extension is parallel to the longitudinal axis 800 of the aircraft.

A flag position allows reducing the aerodynamic drag of the primary propeller 100 when it is not driven by the motor 200, in particular in the case of a primary two-bladed or three-bladed propeller 100.

When the primary propeller 100 comprises more than three blades, the flag position of the primary propeller 100 is the one for which the orientation of the blades offers the least resistance to the wind flow.

In general, the locking system 400 defines at least one locking position. For example, in FIG. 3A, the locking system 400 defines a single locking position because it comprises a single housing 420 cooperating with a single indexing element 410. In FIG. 5, the locking system 400 defines several locking positions because it comprises several housings 421, 422, 423, 424.

According to one example, when multiple locking positions are defined, each locking position places the primary propeller 100 in a position that minimizes its drag. For example, a primary two-bladed propeller 100 can be locked in two locking positions which correspond to the flag positions of the primary propeller 100. In the case of a primary three-bladed propeller 100, three locking positions, corresponding to the flag positions of the primary propeller 100 may be provided.

The locking system 400 can comprise a number of housings 421, 422 equal to a number of blades 101, 102 of the primary propeller 100. Such a configuration can reduce the time required to switch from the free configuration to the engaged configuration. The locking system 400 can comprise a number of indexing elements 410, 410' equal to the number of housings 421, 422, or to the number of blades 101, 102 of the primary propeller 100. According to one example, the locking system 400 comprises a number of indexing elements 410, 410' less than the number of blades 101, 102 of the primary propeller 100, and/or less than the number of housings 421, 422, as seen in FIG. 3B. Although a plurality of indexing elements 410, 410' allows increasing the torque threshold value of the locking system 400, a number of indexing elements 410, 410' which is less than the number of housings 421, 422 and/or the number of blades 101, 102 of the primary propeller 100 allows avoiding an overweight of the locking system 400 and/or avoiding the definition of an excessive torque threshold value compared to the requirements of the aircraft. Moreover, or alternatively, such a configuration can avoid making the locking system 400 hyperstatic in its engaged configuration.

FIG. 2A shows a primary propeller 100, a motor 200 and a locking system 400. The primary propeller 100 and the motor 200 are substantially coaxial so that they share the same axis of rotation 300. For example, a shaft of the primary propeller 100 is secured to the rotor of the motor 200.

The motor 200 and the primary propeller 100 are configured to cooperate in a traction configuration. The locking system 400 is disposed between the primary propeller 100 and the motor 200.

A first assembly 210 and a second assembly 220 of the motor 200 are represented in a rest position, which allows the indexing element 410 of the locking system 400 to be inserted into the housing 420 of the locking system 400 along a direction of insertion 310 which is substantially perpendicular to the axis of rotation 300, and which therefore allows the locking system 400 to switch to its engaged configuration. The locking system 400 is maintained in the engaged configuration by cooperation between a free end 412 of the indexing element 410 and the housing 420. This cooperation can be broken when the motor 200 applies a torque to the first assembly 210 and to the second assembly 220 greater than a torque threshold value of the locking system 400.

FIG. 3A shows a sectional view of the locking system 400 represented in FIG. 2A The locking system 400 comprises a return device 413 tending to insert the free end 412 of the indexing element 410 into the housing 420. A stiffness of the return device 413 at least partially determines the torque threshold value of the locking system 400. The return device 413 comprises a support spring 414 and a calibration screw 415 which cooperate to vary the stiffness of the return device 413.

The indexing element 410 comprises a finger whose free end 412 is inserted into a cylindrical part 419 having the housing 420. The cylindrical part 419 can be attached to the shaft of the motor 200 and/or to the shaft of the primary propeller 100.

The finger is slidably mounted in a casing of the return device 413 which is used to mount the return device 413, to guide the finger and to arrange the support spring 414 and the calibration screw 415.

The housing 420 is presented on a circumferential surface of the cylindrical part 419, opposite to the free end 412 of the indexing element 410. This arrangement can facilitate the insertion of the indexing element 410 into the housing 420 along the direction of insertion 310.

The circumferential surface can comprise a flat portion in which the housing 420 is formed. The flat portion can allow increasing the threshold value of the torque of the locking system 400, and/or causing a progressive compression of the return device 413. In case of punctual application of a parasitic torque disengaging the indexing element 410 from the housing 420 (which may occur during turbulence, for example), the flat portion allows bringing the indexing element back to the housing 420. The flat portion can be dimensioned based on the number of blades, and/or on the number of housings 420 and/or on indexing elements 410, and/or based on the torque threshold value of the locking system 400.

According to one example, the cylindrical part 419 may have a thickness equal to or smaller than the translational stroke (measured in the direction of the translational stroke). For example, the cylindrical part 419 may have a thickness slightly smaller than the translational stroke to escape from the indexing element during the service position.

Such a configuration allows a single locking system 400 to ensure the locking and unlocking of a motor 200 and of a primary propeller 100 when they cooperate in traction as well as in propulsion, possibly using a single cylindrical part 419. In this case, the rest position is disposed between two service positions.

When the cylindrical part includes a circumferential flange 418 (detailed below), the thickness of the cylindrical part 419 does not take into account the thickness of the circumferential flange 418.

The housing 420 can be made in a groove. The groove allows facilitating the insertion of the indexing element 410 into the housing 420 when the first assembly 210 and the second assembly 220 switch from the service position to the rest position. For example, the force required for the compression of the return device 413 to insert the finger into the housing 420 is lower when the finger passes through the groove.

When the groove has a depth (measured from the circumferential surface of the cylindrical part 419 towards the axis of rotation) equal to that of the housing 420, it may be possible that the return device 413 is not compressed when the finger passes through the groove. In this case, it can be said that a locking system 400 has two directions of insertion: the first direction of insertion 310 being perpendicular to the direction of translation 320 (due for example to the orientation of the return device 413), and the second direction of insertion being defined by the groove.

The groove can extend from the housing 420 in the direction of translation 310 (or parallel thereto), or can follow a helical path around the axis of rotation. Its width (which can be measured in the circumferential direction of the cylindrical part 419) can be constant or can vary depending on the distance from the housing 420.

The groove may have a section (measured along its direction/path of extension from the housing 420) which is substantially semi-cylindrical, or even semi-conical, with the base of the cone oriented away from the housing 420, in order to guide the housing 420 towards the indexing element 410 during the switching to the rest position. Other shapes of movable parts 210 can be devised to facilitate the introduction of the indexing element during the translational movement.

As can be seen in FIG. 2B, the locking system 400 is configured so as to switch from the engaged configuration to the free configuration when the motor 200 applies a rotational torque greater than the torque threshold value on the first assembly 210 and the second assembly 220. The torque threshold value can be defined based on the number of blades of the primary propeller 100. For example, a threshold value substantially equal to 10 Nm or more can be sufficient for a small primary propeller 100 with at least two blades, and/or a threshold value of 500 Nm or less can be sufficient for a primary six-bladed propeller 100 or less. When the primary propeller 100 is a three, four or five-bladed propeller, for example, the threshold value may be between 10 and 500 Nm, or between 10 and 350 Nm, or between 350 and 500 Nm, with an increasing number of blades corresponding to a higher threshold value. Thus, a torque applied to the locking system 400 by the flow on the primary propeller 100 under normal flight conditions is not sufficient to unlock it, but a torque applied to the locking system 400 by the motor 200 is sufficient to unlock the primary propeller 100.

When the locking system 400 leaves the engaged configuration, the primary propeller 100 is driven by the motor 200, and therefore generates a thrust which tends to move the housing 420 apart from the indexing element 410 along a direction of translation 320 which is substantially parallel to the axis of rotation 300 (and therefore substantially perpendicular to the direction of translation 310). The thrust also tends to place the first assembly 210 and the second assembly 220 of the motor 220 in a service position. When the first assembly 210 and the second assembly 220 are in the service position, the indexing element 410 and the housing 420 escape from each other, thereby preventing the locking system 400 from returning to the engaged configuration.

Furthermore, the thrust serves to maintain the locking system 400 in a free configuration, since it maintains the first assembly 210 and the second assembly 220 in the service position.

The first assembly 210 and the second assembly 220 can return to the rest position when the motor 200 stops driving the primary propeller 100.

Since the primary propeller 100 and the motor 200 cooperate in the traction configuration, and since the housing 420 is secured to the shaft of the primary propeller 100, the switching to the service position causes a separation of the housing 420 from the motor 200 along the direction of translation 320, to the casing of which the indexing element 410 is attached. Likewise, the switching to the rest position causes an approximation of the housing 420 to the motor 200 (and therefore to the indexing element 410) along the direction of translation 320.

As seen in FIG. 2A, the cylindrical part 419 can comprise a circumferential flange 418. The circumferential flange 418 can define a limit to the translational stroke of the first assembly 210 and of the second assembly 220 relative to each other, or of the housing 420 and of the indexing element 410 relative to each other, at the rest position. The circumferential flange 418 can for example rest on the indexing element 410 to prevent the housing 420 from exceeding the free end 412 of the indexing element 410, for example by limiting the approximation of the housing 420 to the motor 200 along the direction of translation 320. According to one example, the casing also allows adjusting the location of the finger along the direction of translation 320 relative to the housing 420, in order to facilitate the reconfiguration of the locking system 400 during a change of cooperation between the primary propeller 100 and the motor 200. The reconfiguration of the locking system 400 can comprise the reversal of the cylindrical part 419 relative to the direction of translation 320 when the circumferential flange is present.

FIG. 2C shows a motor 200 whose first assembly 210 and second assembly 220 are represented in the rest position, a primary propeller 100 and a locking system 400. The primary propeller 100 can be linked to the motor 200 in the same way as the one whose primary propeller 100 is linked to the motor 200 in FIG. 2A The motor 200 and the primary propeller 100 are configured to cooperate in a propulsion configuration. The motor 200 is disposed between the locking system 400 and the primary propeller 100. The locking system 400 may be substantially identical to the one shown in the FIG. 2A.

As seen in FIG. 2D, when the motor 200 applies a rotational torque greater than the torque threshold value on the first assembly 210 and the second assembly 220, the locking system 400 leaves its engaged configuration, and the motor 200 drives the primary propeller 100. The thrust generated by the primary propeller 100 tends to bring the primary propeller 100 closer to the motor 200 along the direction of translation 320.

Since the primary propeller 100 and the motor 200 cooperate in the propulsion configuration, and since the housing 420 is secured to the shaft of the primary propeller 100, the switching to the service position causes a separation, along the direction of translation 320, of the housing 420 from the motor 200, to which casing the indexing element 410 is attached. Likewise, the switching to the rest position causes an approximation of the housing 420 to the motor 200 along the direction of translation 320.

When the casing of the return device 413 allows adjusting the location of the finger along the direction of translation 320 relative to the housing 420, the locking system 400 can, according to one example, be reconfigured by a change of cooperation between the primary propeller 100 and the motor 200, by reversing the order of the housing 420 and of the insertion element 410 along the direction of translation 320. The reconfiguration of the locking system 400 can comprise the reversal of the cylindrical part 419 relative to the direction of translation 320 when the circumferential flange is present.

FIG. 3B shows an alternative component for the locking system 400 shown in FIG. 3A It is a variant of the cylindrical part 419, comprising several housings 421, 422. The housings 421, 422 are presented on a circumferential surface of the cylindrical part 419. At least one of the housings 421, 422 can be formed in a flat portion of the circumferential surface, or, as seen in FIG. 3B, each housing 421, 422 can be formed in its own flat portion of the circumferential surface.

FIG. 4A shows a motor 200, a primary propeller 100 and a locking system 400. The primary propeller 100 can be linked to the motor 200 in the same way as the one whose primary propeller 100 is linked to the motor 200 in FIG. 2A The primary propeller 100 and the motor 200 are configured to cooperate in a traction configuration. The locking system 400 is disposed between the motor 200 and the primary propeller 100.

The motor 200 is represented with its first assembly 210 and its second assembly 220 in the rest position, which allows the indexing element 410 of the locking system 400 to be inserted/fitted into the housing 420 of the locking system 400 along a direction of insertion 310 which is substantially parallel to the axis of rotation 300, and which therefore allows the locking system 400 to switch to its engaged configuration.

As seen in FIG. 4B, the indexing element 410 comprises a lug whose free end 412 can be inserted into a cylindrical part 419 having the housing 420. The lug protrudes along the direction of insertion 310. The indexing element 410 can be made as a ring disposed around the axis of rotation 300.

The housing 420 is presented on an axial surface of the cylindrical part 419, opposite to the free end 412 of the indexing element 410. This arrangement can facilitate the insertion of the indexing element 410 into the housing along the direction of insertion 310. The cylindrical part 419 may be substantially hollow, for example it may be made as a ring surrounding the shaft of the primary propeller 100.

The housing 420 is made as a notch, a surface of which substantially corresponds to a surface of the free end 412 of the insertion element 410. These corresponding surfaces of the housing 420 and of the indexing element 410 can cooperate with each other such that, when the motor 200 applies a rotational torque greater than the torque threshold value on the first assembly 210 and the second assembly 220 to unlock the locking system 400, these surfaces push the housing 420 and the indexing element 410 to move apart from each other along a direction of translation 320 which is substantially parallel to the axis of rotation 300 (and therefore substantially parallel to the direction of insertion 310).

The torque threshold value of the locking system 400 can be determined at least in part by the geometry of at least one of the corresponding surfaces of the lug and of the notch. By ensuring a movement of the first assembly 210 and the second assembly 220 to leave the rest position when the locking system 400 leaves the engaged configuration, the structure of the locking system 400 (and therefore that of the aircraft) can be simplified.

For example, the torque threshold value may vary depending on the depth of the housing 420. For example, a relatively deep housing 420 may provide a greater torque threshold value than a relatively shallow housing 420.

As an alternative or as a complement, the torque threshold value can vary depending on the stiffness of the edge(s) of the housing 420 in the direction of rotation of the primary propeller 100. For example, for two housings 420 of the same depth, the one having a relatively steep edge in the direction of rotation of the primary propeller 100 can confer a greater torque threshold value than the relatively little steep one.

According to one example, the edges of the housing 420 in the direction of rotation of the primary propeller 100 may define an internal angle in the plane of rotation of the primary propeller 100 of 60-120°.

According to one example, the periphery of the housing 420 can be rounded. This configuration allows reducing wear on the locking system 400.

When one of the edges of the housing 420 is rounded in the direction of rotation of the primary propeller 100, the angle can be considered as defined in part by the tangent of the edge at the level of its connection with the periphery of the housing 420.

To reduce the wear of the locking system 400 (or of its housing 420 or of its indexing element 410), the indexing element 410 can comprise a rolling element at the free end 412 of the lug. In this case, the notch may have a circular surface as described above for the housing 420 shown in FIG. 3A.

Since the housing 420 is secured to the shaft of the primary propeller 100, and since the indexing element 410 is attached to the casing of the motor 200, this separation also tends to translate the first assembly 210 and the second assembly 220 of the motor 200 from each other along the direction of translation 320 towards a service position.

When the locking system 400 has left its engaged configuration, the motor 200 can drive the primary propeller 100, generating a thrust. Since the primary propeller 100 and the motor 200 cooperate in the traction configuration, this thrust may tend to move the housing 420 apart from the indexing element 410 until the indexing element 410 and the housing 420 escape each other, thereby preventing the locking system 400 from returning to the engaged configuration.

Furthermore, the thrust serves to maintain the locking system 400 in a free configuration, since it maintains the first assembly 210 and the second assembly 220 in the service position. The first assembly 210 and the second assembly 220 can return to the rest position when the motor 200 stops driving the primary propeller 100, which allows the locking system 400 to switch to the engaged configuration.

FIG. 4C shows a primary propeller 100, a locking system 400 and a motor. The primary propeller 100 can be linked to the motor 200 in the same way as the one whose primary propeller 100 is linked to the motor 200 in FIG. 2A The primary propeller 100 and the motor 200 are configured to cooperate in a propulsion configuration. The motor 200 is disposed between the primary propeller 100 and the locking system 400. The locking system 400 is substantially identical to the locking system 400 represented in FIG. 4B. It can be seen that the orientation of the locking system 400 represented in FIG. 4C relative to the motor 200 and to the primary propeller 100 is reversed along the direction of translation 320 relative to the locking system 400 represented in FIG. 4B. Consequently, in FIG. 4C, the indexing element 410 is disposed between the primary propeller 100 and the housing 420.

FIG. 5 shows a primary propeller 100, a locking system 400 and a motor 200. The primary propeller 100 can be linked to the motor 200 in the same way as the one whose primary propeller 100 is linked to the motor 200 in FIG. 2A The primary propeller 100 and the motor 200 are configured to cooperate in a traction configuration. The locking system 400 is disposed between the motor 200 and the primary propeller 100.

The motor 200 is represented with its first assembly 210 and its second assembly 220 in the service position, and the locking system 400 is represented in its free configuration. During its driving by the motor 200, the primary propeller 100 generates a thrust tending to maintain the first assembly 210 and the second assembly 220 in the service position, and therefore also tending to maintain the locking system 400 in the free configuration.

The locking system comprise at least two housings 421, 422 and two indexing elements 410, 410'. Other pluralities of housings 421, 422 and/or of indexing elements 410, 410' are also planned. For example, in FIG. 5, the locking system comprises four housings 421, 422, 423, 424 and two indexing elements 410, 410'.

Each indexing element 410, 410' comprises a rod supported perpendicularly and/or radially relative to the axis of rotation 300. Each housing 421, 422 is formed on an axial surface of an opposite cylindrical part 419 of the indexing elements 410, 410'. The housings 421, 422 can be made as notches.

The cylindrical part 419 is disposed around the axis of rotation 300. When the cylindrical part 419 is secured to the casing of the motor 200 or to the aircraft, it may have the shape of a ring in which the shaft of the primary propeller 100, or the rotor of the motor 200 (or more specifically the output shaft of the motor 200) can be arranged.

When the locking system 400 switches to its engaged configuration, the rods are inserted/fitted into the housings 421, 422. To ensure the insertion and the removal (during the switching to the free configuration), the rods can be secured to the first assembly 210 (for example to the shaft of the primary propeller 100), and the cylindrical part 419 can be secured to the second assembly 220 (for example to the casing of the motor 200).

When a rod is secured to a shaft (such as that of the primary propeller 100, for example), its diameter may be smaller than that of the shaft. For example, the diameter of the rod can be comprised between 1/20 and 1/8 of the diameter of the shaft, depending on the number and shape of the blades of the primary propeller 100. When a rod extends radially from the shaft, it can be attached in a radial hole of the shaft. According to one example, such a hole can be a through hole, in order to arrange two rods which are diametrically opposite and secured to each other.

The first assembly 210 and the second assembly 220 of the motor 200 can switch to their rest position when the primary propeller 100 is not driven by the motor 200. Since the primary propeller 100 and the motor 200 cooperate in a traction configuration, this switching is accompanied by an approximation of the primary propeller 100 to the motor 200 along the direction of translation 320, which is substantially parallel to the axis of rotation 300. Since the rods are secured to the shaft of the primary propeller 100, and the cylindrical part 419 is secured to the casing of the motor 200, the approximation of the primary propeller 100 to the motor 200 also causes an approximation of the rods to the housings 421, 422 along a direction of insertion 310 which is substantially parallel to the direction of translation 320.

The separation of the indexing elements 410, 410' from the housings 421, 422 can cause the translation of the first assembly 210 and the second assembly 220 towards the service position, so as to leave the rest position.

At least one of the rods can comprise a circumferential surface at its free end 412 which corresponds to a surface in contact with the housings 421, 422. As seen with the locking system 400 represented in FIG. 4A, the cooperation between these surfaces can move the indexing element(s) 410, 410' apart from the housing(s) 421, 422 along the direction of translation 320 when the motor 200 applies a torque to the first assembly 210 and to the second assembly 220 greater than the torque threshold value of the locking system 400. The torque threshold value of the locking system 400 can be determined at least in part by the geometries of the corresponding surfaces of the rod and of the notch (for example by the same phenomena related to the stiffness and/or to the depth described previously).

To limit wear on the rods and/or notches of the locking system, each rod can comprise a rolling element. Each of the corresponding surfaces of the housings 421, 422 can have a circular surface as described above for the housing 420 shown in FIG. 3A.

The primary propeller 100 comprises two blades 101, 102 and the locking system 400 comprises two housings 421, 422 to ensure two locking positions. When the primary propeller 100 comprises more than two blades, other numbers of locking positions are provided. Other numbers of blades 101, 102 are also provided, as well as other numbers of housings 421, 422 or of indexing elements 410, 410' which can be equal or unequal to the number of blades 101, 102. For example, when the primary propeller 100 comprises four blades 101, 102, 103, 104, the locking system 400 can comprise two indexing elements 410, 410' and four housings 421, 422, 423 and 424 shown in FIG. 5.

A locking system 400 with several indexing elements 410, 410' can have a higher torque threshold value than a locking system 400 with a single indexing element 410.

As seen in FIGS. 4B and 4C, this locking system 400 represented in FIG. 5 can be reoriented relative to the direction of translation 320 to be suitable for a propulsion configuration between the primary propeller 100 and the motor 200.

According to one example, an aircraft according to the present disclosure can be configured to lock and/or unlock the primary propeller 100 during a flight comprising a first flight phase, in which an air flow around the aircraft is substantially parallel to the axis of rotation of the primary propeller, and a second flight phase, in which the air flow around the aircraft is substantially perpendicular to the axis of rotation 300 of the primary propeller 100. For example, it can be configured to cruise transversely, and to take off and/or land vertically.

According to one example, the aircraft can perform a flight maneuver comprising a step in which the thrust of the primary propeller 100 decreases until the first assembly 210 and the second assembly 220 switch to the rest position. For example, the switching of the locking system 400 to the engaged configuration can be achieved when stopping the driving of the primary propeller 100 by the motor 200.

This step can allow the switching of the locking system 400 from the free configuration to the engaged configuration. As an alternative or as a complement, the flight maneuver can comprise a step in which the primary propeller 100 is released in rotation by the application of a motor torque to the first assembly 210 and to the second assembly 220 of the motor 200 greater than the value torque threshold of the locking system 400. This step can allow the switching of the locking system 400 from the engaged configuration to the free configuration.

For example, the aircraft can perform such a maneuver as part of a reorientation of the axis of rotation of the primary propeller 100 relative to the body of the aircraft. In this case, the locking of the primary propeller 100 also allows avoiding gyroscopic effects due to the rotation of the primary propeller 100 around its axis of rotation during reorientation thereof.

The locking of the primary propeller 100 may be useful in many circumstances. For example, when stopping the motor drive achieved in the context of a flight phase (as described above), and/or during a motor 200 failure.

The ability to selectively lock or release the primary propeller 100 passively allows avoiding operational safety problems, compared to a locking by motor torque, or a locking and selective release by electromagnet, and in addition allows reducing the energy consumption of the aircraft.

In general, a locking system 400 can be considered as capable of being used with a motor 200 and a primary propeller 100 cooperating in the traction configuration if the separation of the primary propeller 100 from the motor 200 has the effect of moving the housing 420 apart from the indexing element 410. Likewise, a locking system 400 can be considered as capable of being used with a motor 200 and a primary propeller 100 cooperating in the propulsion configuration if the approximation of the primary propeller 100 to the motor 200 has the effect of moving the housing 420 apart from the indexing element 410.

To make a locking system 400, which capable of being used with the traction configuration, capable of being used with the propulsion configuration (or vice versa), without changing its relative positioning relative to the motor and to the propeller, the orientation of the locking system 400 can be reversed in the direction of translation 320, and the location of the housing 420 and of the insertion element, such that the service position becomes the rest position.

As seen in FIGS. 4B-4C, and in FIGS. 2B & 2D, this can be achieved by reversing the orientation of the locking system 400 and the locations of the locking system 400 and of the motor 200 relative to the primary propeller 100. This technique allows preserving the ways in which the housing 420 and the indexing element 410 are attached to first assembly 210 and to the second assembly 220.

Otherwise, as seen in FIGS. 4B and 5, the same effect can be obtained by reversing the orientation of the locking system 400 and the attachments of the indexing element 410 and of the housing 420 to the first assembly 210 and to the second assembly 220. This technique allows preserving the locations of the locking system 400 and of the motor 200 relative to the primary propeller 100.

To apply this technique to the locking system 400 shown in FIG. 5, it may be necessary to reverse the orientation of the cylindrical part 419, in order to preserve the accessibility of the indexing element 410 (whether in the form of one or several rods or in the form of one or several lugs) to the notches 421, 422, 423, 424.

To apply this technique to the locking system 400 shown in FIG. 4A-4B (or to the one shown in FIG. 4C), it may also be necessary to reverse the orientation of the indexing element 410 in order to preserve the ability of the lug to enter the notch 420.

To apply this technique to the locking system 400 shown in FIGS. 2A-2B (or to the one shown in FIGS. 2C-2D), it may be necessary to reverse the orientation of the cylindrical part 419, in order to preserve the accessibility of the indexing element 410 to the groove (if present) from the service position, and/or to prevent the circumferential flange 418 (if present) from blocking the switching from the service position to the rest position.

The invention claimed is:

1. An aircraft comprising a primary propeller driven in rotation by a motor, the motor having a first assembly and a second assembly movable in rotation relative to each other along an axis of rotation, the primary propeller being secured in rotation to one of said first assembly and second assembly, said aircraft comprising a locking system, comprising a housing and an indexing element, the housing being formed in one among the first assembly and the second assembly, the indexing element being secured to the other among the first assembly and the second assembly, the locking system having an engaged configuration in which the indexing element is at least partially inserted into the housing, and a free configuration in which the indexing element is not at least partially inserted into the housing, the locking system being configured such that, in the engaged configuration, the rotational movement of the first assembly relative to the second assembly is limited to a predetermined angular sector, the locking system being configured so as to switch from the engaged configuration to the free configuration when the motor applies a rotational torque greater than a torque threshold value on the first assembly or on the second assembly, wherein the first assembly and the second assembly are movable in translation relative to each other along a direction of translation defined by the axis of rotation, between a rest position and a service position, and in that the locking system can be in the engaged configuration only when the first assembly and the second assembly are in the rest position, wherein the predetermined angular sector is less than 5°.

2. The aircraft according to claim 1, wherein the indexing element comprises a rolling element able to be introduced into the housing.

3. The aircraft according to claim 1, configured so that a thrust, generated during a driving of the primary propeller by the motor, opposes a switching of the first assembly and the second assembly from the service position to the rest position.

4. The aircraft according to claim 1, wherein the locking system comprises a return device configured to insert the indexing element into the housing when the first assembly and the second assembly are in the rest position.

5. The aircraft according to claim 4, wherein the return device comprises a support spring for pushing one of the indexing element and of the housing towards the other, and a calibration screw in cooperation with the support spring to modify a stiffness of the return device.

6. The aircraft according to claim 4, wherein the indexing element is configured to be inserted into the housing along a direction of insertion which is substantially perpendicular to the axis of rotation, and the return device is configured to insert the indexing element into the housing when the first assembly and second assembly are in the rest position.

7. The aircraft according to claim 1, wherein the indexing element is configured to be inserted into the housing along a direction of insertion which is substantially parallel to the axis of rotation, and the first assembly and the second assembly are configured to leave the rest position when the locking system leaves the engaged configuration.

8. The aircraft according to claim 1, wherein the locking system comprises several housings.

9. The aircraft according to claim 8, wherein the locking system comprises a number of housings equal to a number of blades of the primary propeller.

10. The aircraft according to claim 8, wherein the locking system comprises a number of indexing elements less than a number of blades of the primary propeller.

\* \* \* \* \*